US008783206B2

(12) United States Patent
Kwak

(10) Patent No.: US 8,783,206 B2
(45) Date of Patent: Jul. 22, 2014

(54) WET-LABEL FOR ELECTRONIC DEVICE

(75) Inventor: Jin-Young Kwak, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 347 days.

(21) Appl. No.: 13/241,951

(22) Filed: Sep. 23, 2011

(65) Prior Publication Data

US 2012/0137959 A1 Jun. 7, 2012

(30) Foreign Application Priority Data

Dec. 7, 2010 (KR) ........................ 10-2010-0124189

(51) Int. Cl.
*H04M 1/18* (2006.01)
*G01N 21/81* (2006.01)
*G01D 3/08* (2006.01)

(52) U.S. Cl.
USPC ............................................ 116/206; 73/73

(58) Field of Classification Search
CPC ........... G01D 3/08; G01D 7/00; G01D 7/005; G01N 21/81; G01N 31/22; G01N 31/222; G08B 21/00; G08B 21/18; G08B 21/20; G09F 3/00; G09F 3/02; G09F 3/0291; H04M 1/02; H04M 1/18
USPC ...................... 116/206; 73/29.02, 73, 335.01; 252/408.1, 963; 379/437, 913
See application file for complete search history.

(56) References Cited

U.S. PATENT DOCUMENTS

| | | | | |
|---|---|---|---|---|
| 3,198,163 | A * | 8/1965 | Williams | 116/206 |
| 6,628,785 | B1 * | 9/2003 | Kitamura et al. | 379/437 |
| 6,815,207 | B2 * | 11/2004 | Yabuki et al. | 436/2 |
| 7,105,225 | B2 * | 9/2006 | Birkholz et al. | 428/354 |
| 7,658,095 | B2 * | 2/2010 | Sanford et al. | 73/73 |
| 2009/0273480 | A1 * | 11/2009 | Mittleman et al. | 340/604 |
| 2010/0304091 | A1 * | 12/2010 | Wang | 428/172 |
| 2012/0067270 | A1 * | 3/2012 | Huynh | 116/206 |
| 2013/0052848 | A1 * | 2/2013 | Sloey et al. | 439/271 |

FOREIGN PATENT DOCUMENTS

| | | | | |
|---|---|---|---|---|
| DE | 4031792 | A1 * | 4/1991 | G01N 31/22 |
| JP | 2001312207 | A * | 11/2001 | G09F 3/02 |
| JP | 2002311837 | A * | 10/2002 | G09F 3/10 |
| JP | 2003283619 | A * | 10/2003 | H04M 1/02 |
| JP | 3537328 | | 3/2004 | H04M 1/02 |
| KR | 20-0233281 | | 5/2001 | H04B 1/38 |
| KR | 2006-060904 | | 6/2006 | G09F 3/02 |
| KR | 2006-072537 | | 6/2006 | G09F 3/02 |
| WO | WO 9823920 | A1 * | 6/1998 | G01D 3/08 |

* cited by examiner

*Primary Examiner* — R. A. Smith
(74) *Attorney, Agent, or Firm* — Cha & Reiter, LLC.

(57) ABSTRACT

Disclosed is a wet label that includes a submergence check layer capable of being discolored according to an environmental change (e.g., water, moisture, dampness, etc.). The disclosed wet label includes an adhesive layer; a coating layer provided under the adhesive layer; and a submergence check layer provided under the coating layer, which is discolored according to an internal environmental change, wherein the coating layer blocks environment changes from contacting the submergence check layer. Furthermore, a discolored part of the submergence check layer may be visually checked.

16 Claims, 4 Drawing Sheets

WET-LABEL FOR ELECTRONIC DEVICE

CLAIM OF PRIORITY

This application claims, pursuant to 35 USC 119, priority to, and the benefit of the earlier filing date of, that patent application entitled “Wet-Label for Electronic Device” filed in the Korean Industrial Property Office on Dec. 7, 2010 and assigned Serial No. 10-2010-0124189, the contents of which are hereby incorporated by reference.

BACKGROUND OF THE INVENTION

1. Field of the Invention

The present invention relates to the field of wet labels and, more particularly to a wet label that is used to determine a device has been submerged.

2. Description of the Related Art

In general, products, such as electronic devices (e.g., a portable communication device, a computer, a portable electronic calculator), battery packs, or the like, are subject to serious breakdown when they come in contact with a significant amount of liquid. Specifically, a wet label may be included in or on a device to determine whether the device has been in contact with a significant amount of water (e.g., submerged). A wet label may be used to indicate that the device has experienced a significant liquid event (submergence).

A wet label includes an ink that is either taken off or discolored when submerged or comes in contact with a liquid, e.g., water. Thus, during maintenance of the device, it is possible to determine if a product has been submerged according to the existence or discoloration of the printed portion.

As shown in FIG. 1, a conventional wet label 1 includes: an adhesive part 3 attached on an external surface of a device 2; an ink layer 4 provided at the upper side of the adhesive part 3; a submergence layer 5 provided at the upper side of the ink layer 4; and a coating layer 6 provided at the upper side of the submergence layer 5.

The conventional wet label 1 is configured to inhibit a liquid (such as water) from contacting the front side of the submergence layer (5), and to be discolored when water contacts the lateral side of the submergence layer (5).

As shown in FIG. 2, another conventional wet label 10 includes: an adhesive part 30 attached on the external surface of a device 20; a submergence layer 40 provided at the upper side of the adhesive part 30; and an ink layer 50 provided at the upper side of the submergence layer.

The conventional wet label 10 has no coating layer, and thus is configured to be discolored when the submergence layer comes in contact with any liquid, such as water.

However, conventional wet labels are configured to be attached on the external surface of an electronic device, and thus have some disadvantages. Specifically, when the wet label is discolored by an external temperature change (e.g., moisture exposure) and a user’s mistake (e.g., touch of a wet hand), it is impossible to determine if the electronic device has been submerged. Thus, it is not possible to exactly know the cause of a defect of the electronic device and if may be required to disassemble the device in order to determine if the electronic device had been submerged. Thus, an unnecessary assembling process increases the maintenance cost of the electronic device.

Accordingly, there is a need for a wet label that is not discolored by an external environmental change or a user’s mistake (e.g., touch of a wet hand), and can quickly show if an electronic device a significant amount of liquid has contacted the wet label.

SUMMARY OF THE INVENTION

The present invention provides a wet label for a device, that includes, within a check hole formed in a device case, a submergence check layer capable of being discolored according to an environmental change (e.g., water, moisture, dampness, etc.). This prevents the product from being discolored by an external environmental change and/or a user’s contact with a wet hand. Also, it is possible to exactly determine if the product has been submerged, and to quickly know the cause of a defect of the device. Thus, it becomes unnecessary to disassemble and assemble the device. Thereby reducing a cost in maintaining the device and in analyzing a cause of the defect.

Another aspect of the present invention provides a wet label for an electronic device within a check hole of an electronic device case, the web label including a submergence check layer capable of being discolored according to an environmental change (e.g., water, moisture, dampness, etc.) coming to the lateral surface of the submergence check layer, wherein the submergence check layer is provided with first and second coating layers. In this case, it is possible to block the environmental change coming to the upper and lower portions of the wet label and to protect the wet label. This results in life prolongment and functional improvement of the wet label.

In accordance with an aspect of the present invention, there is provided a an electronic device, including: a check hole formed in a case of the electronic device; an adhesive layer attached on a peripheral lower portion inside the check hole; a coating layer provided under the adhesive layer to block an external environmental change coming through the check hole; and a submergence check layer provided under the coating layer, which is discolored according to an internal environmental change of the case of the electronic device, and allows the submergence check layer to be checked through the check hole.

In accordance with another aspect of the present invention, there is provided an electronic device including: a check hole formed in a case of the electronic device; an adhesive layer attached on a peripheral lower portion inside the check hole; a first coating layer provided under the adhesive layer to block an external environmental change coming from the check hole; a submergence check layer provided under the first coating layer, the submergence layer being discolored according to an environmental change coming to a lateral surface within the case of the electronic device, wherein a discolored part of the submergence check layer can be checked through the check hole, when discolored; and a second coating layer provided under the submergence check layer, which blocks an internal environmental change coming to a lower portion of the submergence check layer.

BRIEF DESCRIPTION OF THE DRAWINGS

The above and other aspects, features and advantages of the present invention will be more apparent from the following detailed description taken in conjunction with the accompanying drawings, in which:

FIG. 6 is a side cross-sectional view illustrating an operation state of a wet label for an electronic device, according to a first embodiment of the present invention; and.

DETAILED DESCRIPTION

Figure 1:
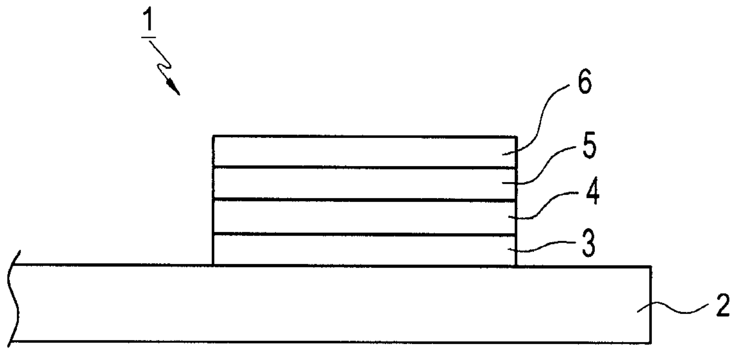
FIG.1 (PRIOR ART)
FIG. 1 is a side cross-sectional view illustrating a conventional wet label for an electronic device.
Figure 2:
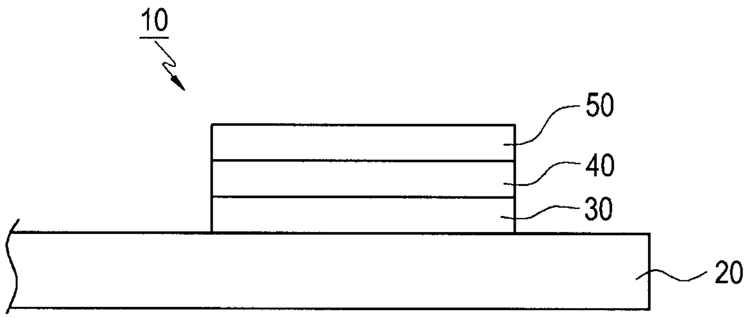
FIG.2 (PRIOR ART)
FIG. 2 is a side cross-sectional view illustrating another conventional wet label for an electronic device.
Figure 3:
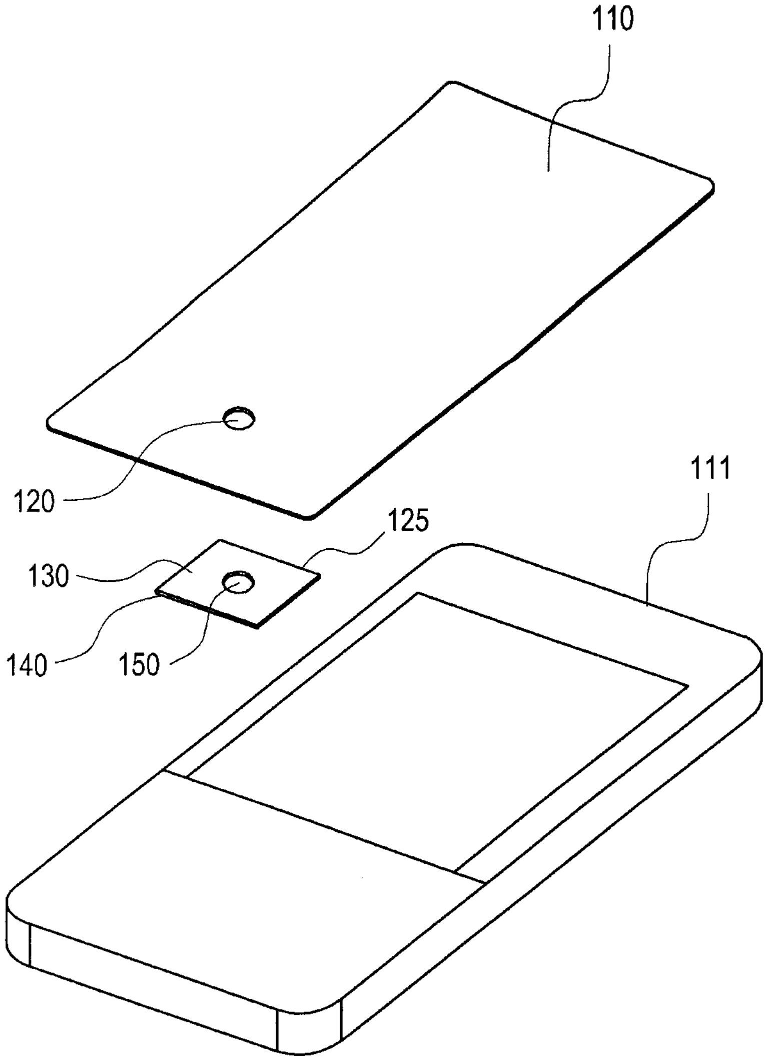
FIG. 3 is an exploded perspective view illustrating the configuration of a wet label for an electronic device, according to a first embodiment of the present invention.

Hereinafter, preferred embodiments of the present invention will be described in detail with reference to the accompanying drawings. The aforementioned embodiments and configurations shown in the drawings are only exemplary preferred embodiments of the present invention. It should be understood that various modifications replacing these can exist at the time of application.

As shown in FIGS. 3 to 6, an electronic device 111 includes a check hole 120 formed in an electronic device case 110 and a wet label 125 including an adhesive layer 130; a coating layer 140; and a submergence check layer 150. The check hole 120 is formed through the electronic device case 110 and the adhesive layer 130 is attached on a peripheral lower portion about the check hole 120 in such a manner that the coating layer 140 and the submergence check layer 150 are attached within the electronic device case 110. The coating layer 140 is provided under the adhesive layer 130 in order to block an external environmental change A1 coming through the check hole 120. For example, external environmental changes may be one or more of water, moisture, dampness, and a wet part of a user's hand. The submergence check layer 150 is provided under the coating layer 140 in such a manner that it can be discolored according to an internal environmental change A2 (e.g., water, moisture, and dampness) of the electronic device case 110. A change in the color of the Submergence check layer caused by an internal environmental change can be checked through the check hole 120.

Figure 4:
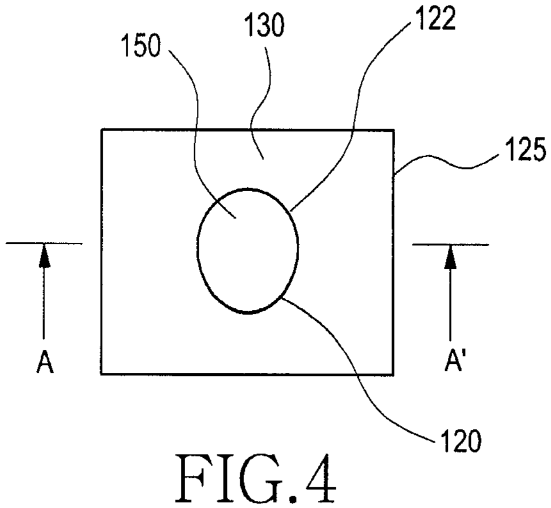
FIG. 4 is a front view illustrating the configuration of a wet label for an electronic device, according to a first embodiment of the present invention.

As shown in FIG. 4, the check hole 120 is formed as a circular shape. However, it would be recognized that the check hole 120 may be formed in any one of a circular shape, an oval shape, a triangular shape, a square shape. a diamond shape, a rectangular shape, etc., and that the circular shape shown is only to illustrate the principles of the invention.

The adhesive layer 130 is representative of a double-sided adhesive (e.g., a tape), that allows for attachment of the wet label 125 to the case 110 on one side and to the coating layer 140 on the other side. That is the adhesive layer is either made of a material or includes a material that enables the adhesive layer to be fixedly contactable on both its lower and upper surface. As would be recognized, the adhesive layer 130 may include other adhesive bonding agents that operable in a manner similar to the illustrated double-sided tape.

The adhesive layer 130 includes a shape 122 that corresponds substantially in position to the check hole 120. Preferably, the shape within the adhesive layer 130 is similar to the shape of check hole 120. However, the shape within the adhesive layer d may be formed in a shape different than that of the check hole 130. In one aspect the shape 122 may be larger or smaller than the check hole 120.

Also, the adhesive layer 130 is formed in the entirety except for the region (area) of the check hole 120 where shape 122 resides. Check hole 120 and shape 122 are aligned so that liquids external to check hole 120 may pass through shape 122.

The coating layer 140, which is attached to the underside of the adhesive layer 130, includes a transparent laminating layer, and may include other transparent materials than the transparent laminating layer (e.g., transparent acrylic material, etc.). Coating layer 140 is impervious to liquid and, thus, prevents liquids entering check hole 120 from proceeding past coating layer 140.

Figure 5:
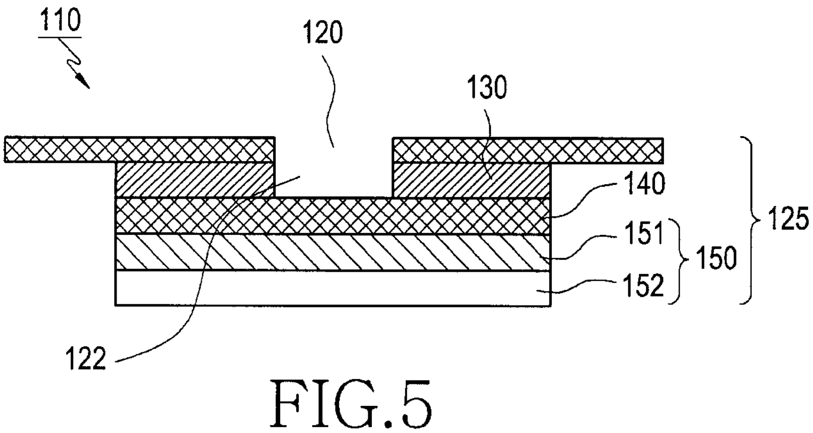
FIG. 5 is a cross-sectional view along A-A' line of FIG. 4.
Figure 6:
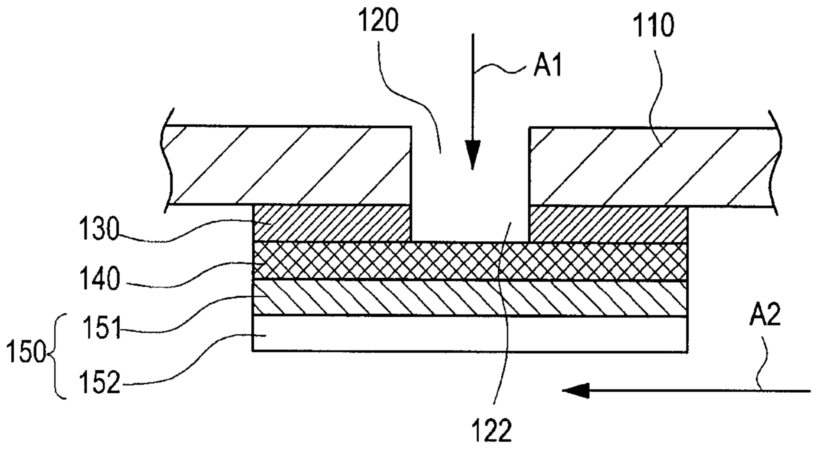

The submergence check layer 150 includes an ink layer 151 and a supporting part 152 (see FIGS. 5 and 6). The ink layer 151 is provided under the coating layer 140 and is protected from the environmental change that may pass through check hole 120. However, the lateral surfaces of ink layer 151 is exposed so as to be discolored when in contact with environmental change A2. Supporting part 152 is provided under the ink layer 151 so as to support the discoloration of the ink layer 151.

Also, the supporting part 152 is made of a material capable of becoming sodden by water or moisture of the environmental change A2. The supporting part 152 may be made of a paper material, or other similar material.

When the supporting part 152 gets wet when in contact with the environmental change A2, it detaches from ink layer 151. The detachment of layer 152 allows the ink layer 151 to be clearly shown through check hole 120 and thus it is possible to more precisely check if the product has been submerged.

The device includes a rear case cover and an upper case cover. Preferably, the check hole is positioned in the rear case cover but could be incorporated into the upper case cover.

Although the wet label 125 according to the principles of the invention is described with regard to an electronic device, the wet label described can be applied to other types of devices and may be applied to various types of products (e.g., cars, clothes, and foodstuffs) requiring wet labels.

Examples of the electronic device 111 according to the above described embodiment of the present invention may include not only mobile communication terminals which operate in accordance with communication protocols corresponding to various communication systems, but also all information communication devices, electronic devices, and multimedia devices (such as a portable multimedia player (PMP), an MP3 player, a navigation device, a game device, a notebook computer, an advertisement panel, a TV, a digital broadcast player, a personal digital assistant (PDA), a smart phone), and their application devices.

The operation process of a wet label according to a first preferred embodiment of the present invention, will be described in more detail with reference to FIGS. 3 to 6.

As shown in FIGS. 3 to 6, electronic device 111 includes a check hole 120 formed in a rear case 110 and a wet label 125 comprising an adhesive layer 130, a coating layer 140, and a submergence check layer 150, that is attached to the inside surface of the rear case 110.

In this state, as shown in FIGS. 3 to 6, the adhesive layer 130 is attached to an inner peripheral surface of the check hole 120. The adhesive layer 130 may be represented as a double-sided tape which has formed, therein, shape 122 that aligns with check hole 120. Thus, the adhesive layer 130 is formed in the entirety except for the region of the check hole 120 (i.e., area 122).

In this state, when water or moisture enters the check hole 120, the coating layer 140 blocks the water or moisture from contacting the submergence check layer 150, thus, protecting the submergence check layer 150 from the entering water or moisture.

However, when the electronic device 111 is comes in contact with a significant amount of liquid (e.g., submerged in a liquid such as water), the liquid enters the internal components of the electronic device 111 (i.e., the device is neither water-proof or water resistant). In this case, the liquid comes in contact with the lateral surfaces or the lower surface of the submergence check layer 150. As the liquid contacts either the lateral surfaces or lower surface of the check layer 150, the check layer 150 becomes discolored.

In addition, in a preferred embodiment the supporting part 152 of the submergence check layer 150 is made of a material capable of becoming sodden softened) by the contacting liquid. Thus, when the supporting part 152 gets wet, it comes off. The removal or detachment of the supporting part 152, allows the (dis)color of the ink layer to be more clearly shown.

The discolored submergence check layer 150 may be viewed through the check hole 120 and it may be determined that the device has been submerged by checking the discolored submergence check layer 150 through the check hole 120.

The operation process of a wet label for an electronic device with the above described configuration, according to a second preferred embodiment of the present invention, will be described with reference to FIG. 7.

Figure 7:
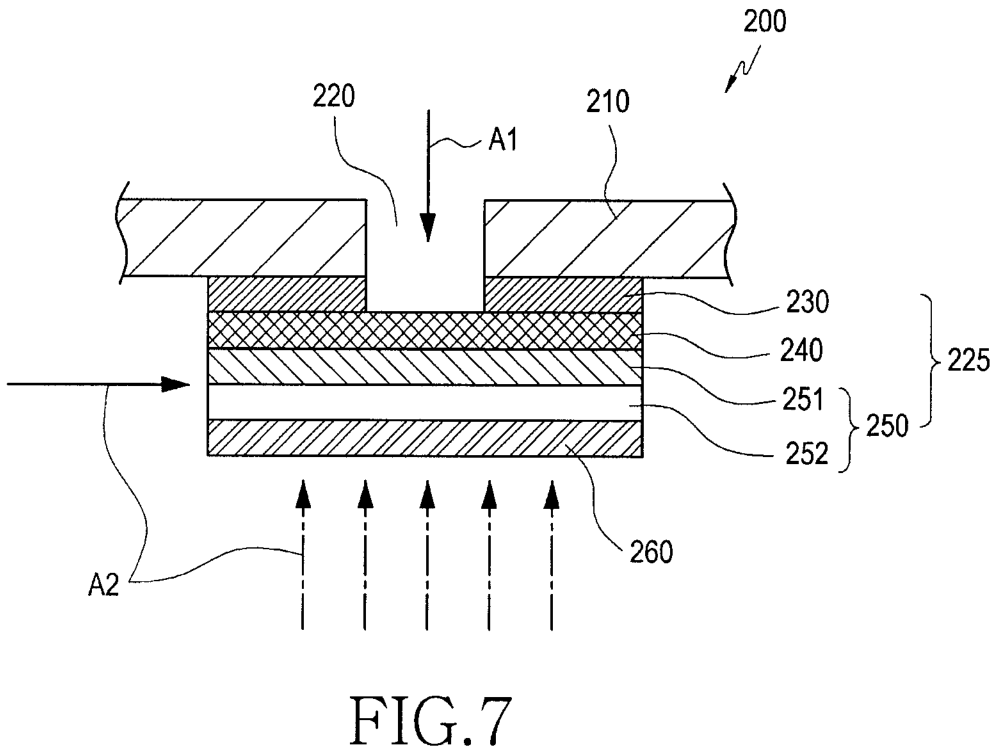
FIG. 7 is a side cross-sectional view illustrating an operation state of a wet label for an electronic device, according to a second embodiment of the present invention.

As shown in FIG. 7, an electronic device 200 that includes a check hole 220 formed in a rear case 210 and a wet label 225 that includes an adhesive layer 230; first and second coating layers 240 and 260; and a submergence check layer 250.

The check hole 220 is formed through the rear case 210 of the electronic device in such a manner that the adhesive layer 230, the first and second coating layers 240 and 260, and the submergence check layer 250 can be configured as described below.

The adhesive layer 230 is attached on a peripheral lower portion inside the check hole 220 in such a manner that the first and second coating layers 240 and 260 and the submergence check layer 250 can be attached within the rear case 210 of the electronic device as described below.

As shown in FIG. 7, the first coating layer 240 is provided under the adhesive layer 230 in order to block an external environmental change A1 (e.g., water, moisture, dampness, and a wet back of a user's hand) entering check hole 220 from contacting the submergence check layer 250.

The submergence check layer 250 is provided under the first coating layer 240 in such a manner that it can be discolored according to an internal environmental change A2 (e.g., water, moisture, and dampness) contained within the case of the electronic device 200.

The second coating layer 260 is provided under the submergence check layer 250 in order to block an internal environmental change A2 contacting the lower portion of the submergence check layer 250.

The check hole 220 and the adhesive layer 230 are similar to the check hole 120 and adhesive layer 130 previously described and, need not be described again herein.

The first and second coating layers 240 and 260 include transparent laminating layers, and may include other transparent materials than the transparent laminating layer (e.g., transparent acrylic material, etc.), as previously described.

The submergence check layer 250 includes an ink layer 251 and a supporting part 252.

The ink layer 251 is provided under the first coating layer 213 so as to be discolored according to the environmental change A2. The supporting part 252 is provided between the ink layer 251 and the second coating layer 260 so as to support the discoloration of the ink layer 251.

The supporting part 251 is preferably made of a paper material, but may also be made of another material than the paper material.

Also, the supporting part 252 is made of a material capable of becoming sodden by water or moisture of the environmental change A2. When the supporting part 252 becomes wet, it detaches. This allows the ink layer 251 to be more clearly shown through the check hole 220, and thus it is possible to more precisely check whether the device 200 has been submerged.

As previously described, in this second embodiment, as shown in FIG. 7, when the electronic device comes in contact with a significant amount of liquid (e.g., submerged), the liquid enters the electronic device and as the liquid comes in contact with the lateral surfaces of the submergence check layer 250 the submergence check layer 250 becomes discolored. The discolored ink layer 251 is viewable from outside the device through the check hole 220.

Thus, a user can know that the electronic device has been submerged by checking the discolored submergence check layer 250 through the check hole 220.

Herein, the first coating layer 240 blocks water or moisture coming from the check hole 220 while blocking the water or moisture from contacting an upper surface of the submergence check layer 250. Similarly, when water or moisture enters the electronic device and contacts the second coating layer 260 and blocks the water or moisture from contacting a lower surface of the submergence check layer 250.

As described above, the first and second coating layers 240 and 2260 provided on and under the submergence check layer 250 block water or moisture from contacting upper and lower surfaces of the submergence check layer 250. Thus, the submergence check layer 250 is discolored by the water or moisture that contacts the lateral surface of the submergence check layer 250.

Thus, it is possible to exactly determine if the electronic product has been in contact with a significant amount of liquid, and to quickly determine if the electronic device requires maintenance. Knowledge of whether the device has contacted a significant amount of liquid is advantageous as an unnecessary disassembly process is avoided, resulting in reduced cost for maintain the device.

The wet label for the electronic device, according to the present invention, as described above, is not limited to the above described embodiment and drawings. It will be apparent to those skilled in the art of the present invention that the wet label may be modified, changed, and substituted in various ways.

While the invention has been shown and described with reference to certain embodiments thereof, it will be understood by those skilled in the art that various changes in form and details may be made therein without departing from the spirit and scope of the invention as defined by the appended claims.

What is claimed is:

1. A wet label for an electronic device, comprising:

a check hole formed in a case of the electronic device;

an adhesive layer attached on a peripheral lower portion inside the check hole;

a coating layer provided under the adhesive layer to block an external environmental change coming from the check hole; and a submergence check layer provided under the coating layer, which is discolored according to an internal environmental change of the case of the electronic device, and allows a discolored part of the submergence check layer to be checked through the check hole, when discolored, wherein the submergence check layer comprises:

an ink layer configured to be discolored in response to contact with the internal environmental change; and a supporting part provided under the ink layer, the supporting part being formed of a material that soddens and becomes detachable from the ink layer in response to contact with the internal environmental change.

2. The wet label for the electronic device as claimed in claim 1, wherein the check hole is formed in any one of a circular shape, an oval shape, a triangular shape, and a square shape.

3. The wet label for the electronic device as claimed in claim 1, wherein the adhesive layer comprises double-sided tape, is formed in accordance with a shape of the check hole, and is formed in entirety except for a region of the check hole.

4. The wet label for the electronic device as claimed in claim 1, wherein the coating layer comprises a transparent laminating layer.

5. The wet label for the electronic device as claimed in claim 1, wherein the case comprises a rear case.

6. The wet label for the electronic device as claimed in claim 1, further comprising:

a second coating layer provided under the submergence check layer, the second coating layer blocking an internal environmental change from contacting a lower surface of the submergence check layer.

7. A wet label for an electronic device, comprising:

a check hole formed therethrough; and a wet label attached to an inside surface of the device, the wet label comprising:

an adhesive layer attached to an inside surface;

a first coating layer attached to the adhesive layer, the first coating layer being viewable through the check hole;

a submergence check layer provided under the first coating layer, the submergence check layer becoming discolored when contacted by an environmental change along a lateral surface as the environmental change is blocked from contacting an upper surface of the submergence check layer by the first coating layer, wherein the submergence layer comprises:

an ink layer configured to be discolored in response to contact with the environmental change; and a supporting part provided under the ink layer, the supporting part being formed of a material that soddens and becomes detachable from the ink layer in response to contact with the environmental change.

8. The wet label for the electronic device as claimed in claim 7, wherein the check hole is formed in one of: a circular shape, an oval shape, a triangular shape, and a square shape.

9. The wet label for the electronic device as claimed in claim 7, wherein the adhesive layer comprises double-sided tape, and includes an opening in the shape of one of: a circular shape, an oval shape, a triangular shape, and a square shape.

10. The wet label for the electronic device as claimed in claim 7, wherein the first coating layer comprises a transparent laminating layer, wherein the first coating layer blocks the environmental change entering the check hole from contacting the submergence check layer.

11. The wet label for the electronic device of claim 7, the wet label further comprising:

a second coating layer provided under the submergence check layer, the second coating layer blocking the environmental change from contacting a lower surface of the submergence check layer.

12. A wet label comprising:

a submergence check layer comprising a material suitable for being discolored when contacted by a liquid;

a first coating layer positioned on an upper surface of the submergence check layer; and a second coating layer positioned on a lower surface of the submergence check layer, the first and second coating layers blocking said liquid from contacting respectively upper and lower surfaces, wherein the submergence check layer is discolored when contacted by a liquid along its lateral surfaces, and wherein the submergence check layer includes an ink layer and a supporting part provided under the ink layer, the supporting part detaching from the ink layer in response to contact with said liquid.

13. The wet label of claim 12, wherein the first coating layer is transparent.

14. The wet label of claim 12, further comprising:

an adhesive layer, attached on one side, to a upper surface of the first coating layer, the adhesive layer including an opening causing a portion of the upper surface of the first coating layer to be exposed to environmental changes.

15. The wet label of claim 14, wherein the adhesive layer is double-sided tape.

16. The wet label of claim 14, wherein the adhesive layer is fixedly contactable on both a lower and upper surface.

* * * * *